United States Patent [19]

Henman et al.

[11] 4,082,720

[45] * Apr. 4, 1978

[54] PROCESS FOR FORMING POLYMERIC COMPOSITIONS

[75] Inventors: Terence John Henman, Haslingfield; Graham Williams, Runcorn, both of England

[73] Assignee: Imperial Chemical Industries Limited, London, England

[*] Notice: The portion of the term of this patent subsequent to Dec. 28, 1993, has been disclaimed.

[21] Appl. No.: 627,775

[22] Filed: Oct. 31, 1975

Related U.S. Application Data

[63] Continuation of Ser. No. 257,143, May 26, 1976, Pat. No. 4,000,111.

[30] Foreign Application Priority Data

May 28, 1971 United Kingdom ............... 17712/71
Aug. 27, 1971 United Kingdom ............... 40273/71

[51] Int. Cl.² ......................... C08K 3/24; C08K 7/14; C08K 9/06; C08L 23/00

[52] U.S. Cl. .............................. 260/42.15; 260/42.14; 260/42.18; 260/42.45; 260/42.46; 260/878 R

[58] Field of Search ............... 260/42.14, 42.15, 42.18, 260/42.45, 42.46, 878 R

[56] References Cited

U.S. PATENT DOCUMENTS

| B 257,143 | 3/1976 | Henman et al. ................... 260/42.15 |
| 3,437,550 | 4/1969 | Paul ............................... 260/41 AG |

*Primary Examiner*—Harry Wong, Jr.
*Attorney, Agent, or Firm*—Cushman, Darby & Cushman

[57] ABSTRACT

A process of forming a polymeric composition of blend of at least one carboxylic acid which is an aromatic acid, a hydroxy-acid, or a polycarboxylic acid or the anhydride of such an acid and a polypropylene/unsaturated carboxylic acid or anhydride graft copolymer has adhesive properties similar to those of the graft copolymer alone. The blend is readily produced and can be used in a fibre reinforced thermoplastic material. A particularly good effect is obtained with cyclic anhydrides and those acids capable of forming such anhydrides. The graft copolymer is preferably a polypropylene/maleic anhydride graft copolymer.

14 Claims, No Drawings

PROCESS FOR FORMING POLYMERIC COMPOSITIONS

This is a continuation, of application Ser. No. 257,143 filed May 26, 1972, now U.S. Pat. No. 4,000,111.

The present invention relates to polymer compositions and in particular to compositions suitable for promoting adhesion between polyolefines, especially polypropylene, and other materials.

The polymers and copolymers of the olefine monomers possess a useful combination of mechanical properties coupled in many cases with chemical inertness to many environments. The polymers of ethylene and propylene are used extensively commercially in view of their useful combination of properties. However, although the chemical inertness of these polymers is very desirable and useful in many applications, this inertness makes it difficult to form a bond between the olefine polymer and another material. Adhesives have been developed to overcome this difficulty, and such adhesives include graft copolymers obtained by grafting, onto an olefine polymer, an ethylenically unsaturated monomer containing at least one carboxylate group.

According to the present invention there is provided a polymeric composition which comprises a blend of (a) at least one compound selected from aromatic monocarboxylic acids, monocarboxylic acids containing at least one —OH group and which are capable of forming a ring anhydride, polycarboxylic acids containing not more than four carboxylic acid groups, and containing not more than one atom of an element other than carbon, hydrogen or oxygen in the molecule, and anhydrides of such acids and (b) a graft copolymer obtained by grafting an unsaturated dicarboxylic acid or the anhydride thereof onto a propylene polymer wherein 1 – 90% of the functions

contained in the acid and/or anhydride groups are present in the acid or anhydride component of the graft copolymer.

A wide range of acids and anhydrides can be used as component (a) of the blend. Thus, component (a) can be an aromatic monocarboxylic acid, a suitable acid of this type being benzoic acid. Monocarboxylic acids containing at least one —OH group and capable of forming a ring anhydride will, for convenience, be referred to as "hydroxymonocarboxylic" acids and it should be appreciated that this term does not include those monocarboxylic acids which contain an —OH group and which are incapable of forming a ring anhydride. The hydroxymonocarboxylic acids used as component (a) of the blend may undergo ring formation for example by condensation of two molecules to give a lactide structure of the type

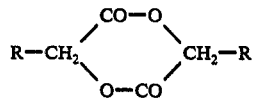

where R is hydrogen, an aliphatic, aromatic or cycloaliphatic group. A wide range of such acids are known and we have found lactic acid to be very suitable. Suitable polycarboxylic acids include di-, tri- and tetra-carboxylic acids, which may be aliphatic or aromatic, saturated or unsaturated. Acids including hydroxy groups can be used and the acid can include one hetero-atom, that is an atom of an element other than carbon, hydrogen and oxygen. Suitable saturated polycarboxylic acids include oxalic acid, succinic acid, adipic acid, and citric acid. Unsaturated acids which can be used include maleic acid, fumaric acid, and itaconic acid. Tartaric acid is an example of a polycarboxylic acid which includes at least one hydroxy group, and phthalic acid is an example of an aromatic polycarboxylic acid. Polycarboxylic acids including a hetero-atom include thiodipropionic acid [S(CH$_2$CH$_2$COOH)$_2$] and nitrilotriacetic acid [N(CH$_2$COOH)$_3$]. Anhydrides of the foregoing acids can be used, although these may be more, or less, effective than the parent acid. Benzoic, maleic, succinic and phthalic anhydrides are examples of suitable anhydrides and of these succinic and phthalic anhydrides are noticeably more effective than the parent acid. Other anhydrides which can be used include glutaric anhydride, pyromellitic dianhydride

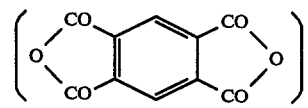

and 'polydride 230' which is a dianhydride having the formula

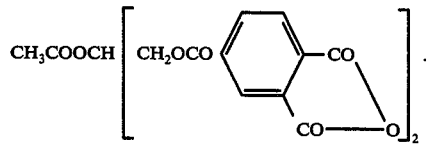

Component (b) of the blend can be any graft copolymer which is effective as an adhesive, such copolymers including the product of grafting maleic acid, itaconic acid or maleic anhydride onto a propylene polymer. Graft copolymers of maleic anhydride and a propylene polymer are available commercially and are thus particularly convenient for use as component (b) of the blend.

Thus, as a further aspect of the present invention there is provided a polymeric composition comprising a blend of (a) at least one compound selected from aromatic monocarboxylic acids, monocarboxylic acids containing at least one —OH group and which are capable of forming a ring anhydride, polycarboxylic acids containing not more than four carboxylic acid groups and containing not more than one atom of an element other than carbon, hydrogen and oxygen in the molecule, and anhydrides of such acids, and (b) a graft copolymer obtained by grafting maleic anhydride onto a propylene polymer wherein 1 to 90% of the functions

contained in the acid and/or anhydride groups are present in the maleic anhydride of the graft copolymer.

Preferably from 25 up to 80% of the functions

are present as the acid and/or anhydride component of the graft copolymer.

The propylene polymer is preferably a crystalline polymer and may be a homopolymer or a copolymer with a minor proportion, up to 25% by weight, of another olefine monomer, such as ethylene. The blend can be used in a similar manner to the graft copolymer alone as an adhesive, and we have found that the properties of some blends are very similar to those of the graft copolymer alone. The blend can be used to provide bonding between a propylene polymer and an inorganic filler such as a glass fiber as described in British Patent Nos. 1,095,700 and 1,174,943. The blend can be used in the production of a filled polymer composition using any suitable technique for producing such compositions and is particularly useful when used to produce a fiber reinforced thermoplastic material, for example glass fiber reinforced polypropylene using the process of German Patent application No. 2,117,095.

The effectiveness of the blend as an adhesive is very conveniently determined by measurement of the tensile strength of a moulding formed from a composition comprising glass fiber, a propylene polymer and the blend. Mouldings are formed using the grafted polymer only as an adhesive and also using a blend of acid or anhydride and the grafted polymer as an adhesive. The tensile strength of the mouldings is determined and the difference between the tensile strengths gives an indication of the effectiveness of any particular acid or anhydride. An improvement of less than 300 p.s.i. in tensile strength is not regarded as being a significant improvement. An improvement of at least 300 p.s.i. indicates that the acid or anhydride is effective in improving adhesive and materials giving improvements in this range include oxalic acid, malonic acid, succinic acid, phthalic acid, citric acid, nitrilotriacetic acid, benzoic acid and benzoic anhydride. It is preferred that the improvement obtained should be greater than 1500 p.s.i. and materials giving such an effect include lactic acid, maleic anhydride; succinic anhydride; phthalic anhydride; glutaric anhydride; pyromellitic dianhydride; 'polydride 230'; maleic acid; fumaric acid; adipic acid; itaconic acid; thiodipropionic acid and tartaric acid. Useful improvements in the tensile properties of the mouldings are obtained when the blend contains either an acid which is capable of forming a ring anhydride or the anhydride of such an acid.

Thus, as a preferred embodiment of the present invention there is provided a blend wherein component (a) is at least one carboxylic acid which is capable of forming a ring anhydride and/or at least one anhydride of such an acid and (b) a graft copolymer obtained by grafting an unsaturated dicarboxylic acid or the anhydride thereof, particularly maleic anhydride, onto a propylene polymer wherein 1 to 90%, and preferably between 25 and 80%, of the functions

contained in the acid and/or anhydride groups are present in the acid or anhydride component of the graft copolymer.

Suitable ring anhydrides include maleic anhydride; succinic anhydride; glutaric anhydride; phthalic anhydride, pyromellitic dianhydride and 'polydride 230'. Suitable acids which are capable of forming ring anhydrides include lactic acid, maleic acid, fumaric acid, succinic acid, phthalic acid, adipic acid, itaconic acid, and tartaric acid.

A particularly useful blend in accordance with the present invention comprises phthalic anhydride and a graft copolymer of maleic anhydride and a propylene polymer. The acids and acid anhydrides which may be used can be unsaturated and with such materials it will be appreciated that the unsaturated acid or anhydride may be present both as component (a) of the blend and also as a component of the graft copolymer. As will be set out in more detail hereafter, it is particularly convenient to use a blend wherein component (a) and the acid or anhydride component of the graft copolymer are both the same, for example a blend of free maleic anhydride and a graft copolymer of maleic anhydride and a propylene polymer.

The blend of the present invention is particularly useful for inclusion in filled propylene polymers.

According to a further aspect of the present invention there is provided a composition comprising an inorganic filler, a crystalline propylene polymer and a blend of (a) at least one compound selected from aromatic monocarboxylic acids, monocarboxylic acids containing at least one —OH group and which are capable of forming a ring anhydride, polycarboxylic acids containing not more than four carboxylic acid groups and containing not more than one atom of an element other than carbon, hydrogen and oxygen in the molecule and anhydrides of such acids and (b) a graft copolymer obtained by grafting an unsaturated dicarboxylic acid or the anhydride thereof, preferably maleic anhydride, onto a propylene polymer, wherein in said blend 1 to 90%, and preferably between 25 and 80%, of the functions

contained in the acid and/or anhydride groups are present as the acid or anhydride component of the graft copolymer.

Such a composition can be used in the manner well known in the art for the production of injection moulded articles and the like, for example fans, impellers, filters and motor car components.

The inorganic filler is conveniently a fibrous reinforcing material such as glass fiber and for the best results the filler should be coated with a silane containing at least one substitutent which is reactive with the filler and at least one acid reactive organic substituent. The substituent which is reactive with the filler may be hydroxy, alkoxy, or halide and is preferably hydroxy or alkoxy. The acid reactive organic substituent may be epoxy, hydroxy, amino, hydroxyalkyl, isocyanate or mercapto and is preferably hydroxy, epoxy or amino. Silanes which can be used to coat the filler include epoxyethyltriethoxy silane, γ-glycidoxypropyltrimethoxy silane, glycidoxyethyltriethoxy silane, 1,2-epoxybutyltriethoxy silane, 1,2-epoxybutoxy-propyltriethoxy silane, β-(3,4-epoxycyclohexyl) ethyltrimethoxy silane, γ-aminopropyltriethoxy silane, aminoethyltriethoxy silane, γ-aminobutyltriethoxy silane, and bis(β-hydroxyethyl)-γ-amino-propyltriethoxy silane.

The blend of acid or anhydride and grafted propylene polymer may be prepared by any of the known blending techniques. A suitable technique is to dissolve the acid of anhydride in a suitable solvent, preferably one having a low boiling point, mixing the solution of acid or anhydride with the solid graft copolymer and then evaporating off the volatile solvent. Suitable solvents for this purpose include acetone, benzene, ethyl acetate and chloroform. Many suitable acids and anhydrides are solid materials and as an alternative a conventional solid mixing technique, for example using a high speed mixer, can be used to produce the blend.

Alternatively, if the blend is one wherein component (a) and the acid or anhydride component of the graft copolymer are both the same, for example a blend containing free maleic anhydride and a maleic anhydride grafted polymer, such a blend is conveniently obtained by using an excess of the unsaturated acid or anhydride in preparing the graft copolymer and not removing all the excess unreacted acid or anhydride when the grafting has been completed. In preparing blends in this manner, the unsaturated acid or anhydride and the propylene polymer can be mixed together and grafting is then effected using any of the known techniques. Suitable methods for carrying out grafting include radiation grafting, solution grafting using a free radical initiator and/or an oxidised polymer, extrusion grafting or fluidised bed grafting. Using an extrusion grafting technique it is preferred to use a free radical initiator but under the conditions used some grafting may result from the presence of a minor proportion of oxygen which is present in the polymer. Graft copolymers containing an acid, for example maleic acid, can be prepared either by grafting the acid onto a propylene polymer or by the hydrolysis of a graft copolymer of a propylene polymer and a suitable derivative of the acid such as an anhydride of the acid, for example a maleic anhydride graft copolymer can be hydrolysed to give a maleic acid graft copolymer.

When the graft copolymer is one containing grafted maleic anhydride, it should contain at least 0.01% and preferably at least 0.4% by weight of grafted maleic anhydride. In general graft copolymers containing more than 6% by weight of grafted maleic anhydride do not have significantly better properties than polymers with a lower content of grafted maleic anhydride. For blends of maleic anhydride and a maleic anhydride-containing graft copolymer prepared by a grafting process using an excess of maleic anhydride, if the graft copolymer as prepared does not contain a sufficient quantity of the function

present as free maleic anhydride, further maleic anhydride can be added in order to attain the desired level of free maleic anhydride. Alternatively, the graft copolymer as prepared may contain some free maleic anhydride and a quantity of a different acid or anhydride may be added to obtain a sufficient quantity of the function

present as free acid and/or anhydride.

When using a blend of maleic anhydride and a maleic anhydride graft copolymer, although a significant improvement (compared to maleic anhydride alone) is obtained with only 25% by weight of the maleic anhydride in the grafted form, in some cases we have found that a slight further improvement is obtained as the level of grafted maleic anhydride is increased to about 50% by weight. Above this level of grafted maleic anhydride little further significant improvement occurs.

In the polymer composition comprising inorganic filler, crystalline propylene polymer, acid and/or anhydride and graft copolymer, satisfactory properties are obtained when the amount of total (combined and free) acid and/or anhydride is as low as 0.02% by weight of the polymer content of the composition, although it will be appreciated that this is dependent on the relative proportions of filler and crystalline propylene polymer, the nature of the filler, the type of graft copolymer and also the particular acid and/or anhydride used. Thus, it is preferred that the total amount of acid and/or anhydride is at least 0.02% by weight of the polymer content of the composition and for most systems the amount of total acid and/or anhydride is in the range 0.02 to 1.0% by weight of the polymer content of the composition. When the filler is glass fiber and a blend of free maleic anhydride and a maleic anhydride grafted copolymer is used, we have found that satisfactory mechanical properties are obtained with a total of 0.04% by weight of maleic anhydride of which from 25 up to 80% by weight is in grafted form. If the free maleic anhydride is replaced by other free acids or anhydrides, satisfactory mechanical properties can be obtained at the same concentrations, but it should be realised that the effectiveness of a given acid is more properly considered on the basis of the number of carboxylic acid groups present and not on the weight of the additive used. A different graft copolymer can be used to replace the maleic anhydride graft copolymer at the same concentration but the optimum level of the graft copolymer will be dependent on the particular acid or anhydride which is in grafted form and the effectiveness of any graft copolymer is more properly considered on the basis of the number of carboxylic acid groups present rather than the proportion by weight of the grafted acid or anhydride in the copolymer.

The present invention will now be described by reference to the following examples which are illustrative of the invention but not limiting.

EXAMPLE 1

A masterbatch containing 4% by weight of free maleic anhydride based on the weight of the masterbatch was prepared by mixing maleic anhydride and unstabilised polypropylene powder in a high speed mixer.

A graft copolymer of polypropylene and maleic anhydride containing 0.8% by weight of grafted maleic anhydride and a negligible proportion of free maleic anhydride, was blended in a high speed mixer with a sufficient quantity of the polypropylene/maleic anhydride masterbatch to produce a blend in which 50% of the total maleic anhydride present was in the grafted form.

This blend was then mixed with polypropylene and glass fibre by tumble blending to give a composition in which the total maleic anhydride level was 0.04% by weight based on the weight of polymer and the glass fibre content was 20% by weight of the total composition. The glass fibre was 0.25 inch long chopped fibre of 0.0005 inch diameter and was coated with γ-aminopropyltriethoxy silane. The composition thus obtained was injection moulded at a temperature of 240° C to give tensile bars whose strengths were determined using ASTM Test D638-68 modified by using a temperature of 20° C and an extension rate of 1.0 inch per minute.

EXAMPLES 2 and 3

Example 1 was repeated twice using different relative proportions of free and grafted maleic anhydride and a constant total quantity (0.04% by weight on polymer) of maleic anhydride. Comparative tests were also carried out with free maleic anhydride only (0.04% by weight) and with grafted maleic anhydride only (0.04% by weight). A further comparative test was also carried out in the total absence of maleic anhydride. Comparative tests were also carried out with 0.01% by weight and 0.02% by weight of grafted maleic anhydride in the absence of free maleic anhydride.

The results obtained are set out in Table 1.

TABLE 1

| Example or Comparative Example | % free maleic anhydride (based on total maleic anhydride) | % grafted maleic anhydride (based on total maleic anhydride) | Total maleic anhydride (ppm by weight of polymer) | Tensile strength (kilopounds/ sq. in.) | Improvement (kilopounds/ sq. in.) |
|---|---|---|---|---|---|
| 1 | 50 | 50 | 400 | 12.7 | 2.4 |
| A | 0 | 100 | 200 | 11.4 | — |
| 2 | 75 | 25 | 400 | 12.8 | 2.5 |
| B | 0 | 100 | 100 | 10.3 | — |
| 3 | 20 | 80 | 400 | 12.8 | 2.5 |
| C | 100 | 0 | 400 | 7.6 | — |
| D | 0 | 100 | 400 | 12.7 | — |
| E | 0 | 0 | 0 | 7.0 | — |

*Relative to Comparative Example B

EXAMPLES 4 to 9

A further series of experiments were carried out following the procedure of Example 1 and using either maleic acid or maleic anhydride together with the maleic anhydride grafted copolymer. The experiments and the results obtained are summarised in Table 2.

TABLE 2

| Example or Comparative Example | Grafted maleic anhydride (ppm by weight) | Free maleic anhydride (ppm by weight) | Free maleic acid (ppm by weight) | Tensile strength (kilopounds/ sq. in.) |
|---|---|---|---|---|
| F | 0 | 400 | 0 | 8.6 |
| 4 | 20 | 380 | 0 | 10.4 |
| 5 | 40 | 360 | 0 | 11.1 |
| 6 | 100 | 300 | 0 | 12.6 |
| 7 | 100 | 0 | 300 | 12.0 |
| 8 | 200 | 200 | 0 | 13.2 |
| 9 | 200 | 0 | 200 | 12.8 |
| G | 400 | 0 | 0 | 13.0 |

EXAMPLES 10 to 14

The procedure of Example 1 was repeated replacing maleic anhydride with acids or anhydrides as set out in Table 3. The acids or anhydrides were incorporated in a molar proportion equivalent to 300 ppm by weight, based on the polymer, of free maleic anhydride.

TABLE 3

| Example or Comparative Example | Combined maleic anhydride (ppm by weight) | Acid or anhydride added | Tensile strength (kilopounds/ sq. in.) | *Improvement (kilopounds/ sq. in.) |
|---|---|---|---|---|
| H | 0 | None | 8.2 | — |
| J | 400 | None | 12.2 | — |
| K | 100 | None | 9.6 | — |
| 10 | 100 | Malonic Acid | 10.0 | 0.4 |
| 11 | 100 | Oxalic Acid | 10.3 | 0.7 |
| 12 | 100 | Tartaric Acid | 11.6 | 2.0 |
| 13 | 100 | Itaconic Acid | 11.4 | 1.8 |
| 14 | 100 | Phthalic Anhydride | 11.7 | 2.1 |

*Relative to Comparative Example K.

EXAMPLES 15 to 19

A further series of experiments was carried out as described in respect of Examples 10 to 14 but with various proportions of free acid or anhydride. The results of these experiments are set out in Table 4.

TABLE 4

| Example or Comparative Example | Combined maleic anhydride (ppm by weight) | Acid or adhydride added | Tensile strength (kilopounds/ sq. in.) | Improvement*** (kilopounds/ sq. in.) |
|---|---|---|---|---|
| L | 0 | None | 8.8 | — |
| M | 400 | None | 12.6 | — |
| N | 100 | None | 9.6 | — |
| 15 | 100 | Adipic* Acid | 12.0 | 2.4 |
| 16 | 100 | Benzoic* Anhydride | 10.6 | 1.0 |
| 17 | 100 | Benzoic** Acid | 10.3 | 0.7 |
| 18 | 100 | Phthalic** Acid | 10.5 | 0.9 |
| 19 | 100 | Succinic* Anhydride | 11.8 | 2.2 |

*3 millimoles/kgm polymer
**6 millimoles/kgm polymer
***Relative to Comparative Example N

EXAMPLES 20 to 23

A further series of experiments was carried out as described in respect of Examples 10 to 14 but with various proportions of other free acids or anhydrides. The results obtained are set out in Table 5.

TABLE 5

| Example or Comparative Example | Combined maleic anhydride (ppm by weight) | Free acid or anhydride added | Amount of free acid or anhydride+ | Tensile strength (kilopounds/ sq. in.) | Improvement* (kilopounds/ sq. in.) |
|---|---|---|---|---|---|
| O | 100 | None | 0 | 10.8 | — |
| P | 400 | None | 0 | 13.2 | — |
| 20 | 100 | Glutaric anhydride | 300 | 13.4 | 2.6 |
| 21 | 100 | Thiodipropionic acid | 300 | 12.9 | 2.1 |
| 22 | 100 | Nitrilotriacetic acid | 200 | 11.3 | 0.5 |
| 23 | 100 | Pyromellitic dianhy- | 300 | 12.9 | 2.1 |

TABLE 5-continued

| Example or Comparative Example | Combined maleic anhydride (ppm by weight) | Free acid or anhydride added | Amount of free acid or anhydride+ | Tensile strength (kilopounds/ sq. in.) | Improvement* (kilopounds/ sq. in.) |
| --- | --- | --- | --- | --- | --- |

+millimoles/kgm polymer
*relative to Comparative Example O.

EXAMPLES 24 and 25

A further series of experiments was carried out as described in respect of Examples 10 to 14 but using different proportions of other free acids or anhydrides. The results are set out in Table 6.

TABLE 6

| Example or Comparative Example | Combined maleic anhydride (ppm by weight) | Free acid or anhydride added | Amount of free acid or anhydride (mM/kgm polymer) | Tensile strength (kilopounds/ sq. in.) | Improvement* (kilopounds/ sq. in.) |
| --- | --- | --- | --- | --- | --- |
| Q | 100 | None | 0 | 11.7 | — |
| R | 400 | None | 0 | 14.1 | — |
| 24 | 100 | Citric Acid | 200 | 12.4 | 0.7 |
| 25 | 100 | Dianhydride** | 150 | 13.3 | 1.6 |

*relative to Comparative Example Q.
**a dianhydride having the formula

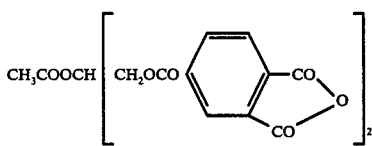

EXAMPLES 26 to 29

A further series of experiments was carried out as described in respect of Examples 10 to 14 but using different proportions of various free acids. The results obtained are set out in Table 7.

TABLE 7

| Example or Comparative Example | Combined maleic anhydride (ppm by weight) | Free acid added | Amount of free acid (mM/kgm polymer) | Tensile strength (kilopounds/ sq. in.) | Improvement* (kilopounds/ sq. in.) |
| --- | --- | --- | --- | --- | --- |
| S | 100 | None | 0 | 10.7 | — |
| T | 400 | None | 0 | 13.1 | — |
| 26 | 100 | Succinic | 300 | 11.9 | 1.2 |
| 27 | 100 | Fumaric | 300 | 13.1 | 2.4 |
| 28 | 100 | Lactic | 600 | 13.2 | 2.5 |
| 29 | 100 | Phthalic | 300 | 12.1 | 1.4 |

*relative to Comparative Example S

EXAMPLES 30 to 32

A series of experiments was carried out by forming a masterbatch containing 5% by weight of phthalic anhydride in a propylene polymer as described in Example 1. The general procedure of Example 1 was repeated using the phthalic anhydride masterbatch to produce samples containing varying levels of free phthalic anhydride. The results obtained are set out in Table 8.

TABLE 8

| Example or Comparative Example | Combined maleic anhydride (ppm by weight) | Amount of phthalic anhydride (% by weight on polymer) | Tensile strength (kilopounds/ sq. in.) |
| --- | --- | --- | --- |
| U | 400 | 0 | 12.6 |
| V | 200 | 0 | 11.5 |
| 30 | 200 | 0.05 | 12.6 |
| 31 | 200 | 0.10 | 12.5 |
| 32 | 200 | 0.20 | 12.4 |

EXAMPLE 33

Further samples of the materials used in Example 31 and Comparative Example U were subjected to tests to determine the effect of extended contact with boiling water.

The samples were formed into tensile bars and these were boiled together, in distilled water, for periods of up to 260 hours, the bars being removed for testing at various times during the boiling. After removal from the water, the bars were dried and, at the completion of the experiment, all the bars were aged together for two hours in an oven maintained at 130° C. After 260 hours immersion in the boiling water, the bars formed from the material of Example 31 showed a decrease in tensile strength of 9% whilst bars of the material of Comparative Example U showed a decrease in tensile strength of 10%. It was noted that the difference between a 72 hours and a 260 hours immersion was small.

EXAMPLES 34 and 35

The general procedure of Examples 1 to 32 was repeated using graft copolymers of a propylene polymer and itaconic acid. The graft copolymer was used as a blend with free itaconic acid. The results obtained are set out in Table 9.

TABLE 9

| Example | Combined itaconic acid (ppm by weight) | Free itaconic acid (ppm by weight) | Tensile strength (kilopounds/ sq. in.) |
| --- | --- | --- | --- |
| 34 | 320 | 70 | 12.2 |
| 35 | 300 | 450 | 14.0 |

For comparison with the results obtained with maleic anhydride graft copolymers, the weight of itaconic acid should be reduced by a factor of approximately 1.3. Thus, in Example 34 the quantities of combined and free itaconic acid are equivalent to about 250 and 50 ppm by weight respectively of maleic anhydride. Similarly, in Example 35, the quantities of itaconic acid are equivalent to 230 ppm by weight of combined and 340 ppm by weight of free maleic anhydride.

A graft copolymer of maleic acid and a propylene polymer can be used in a corresponding manner to obtain a similar effect.

Further experiments were carried out in which the additive used was acetamide, succinimide, stearic acid, pentaerythritol, glycine, urea, 4-aminobutanoic acid, or ethylene diamine tetra-acetic acid and in all cases no significant improvement in tensile properties was obtained and indeed in the case of several of these materials the tensile strength decreased as a result of the incorporation of the additive.

We claim:

1. A process of forming a polymeric composition by mixing (a) at least one compound which is a carboxylic acid or a carboxylic acid anhydride selected from the group consisting of (I) benzoic acid, (II) lactic acid, (III) polycarboxylic acids which contain not more than four carboxylic acid groups and not more than one atom of an element other than carbon, hydrogen or oxygen in the molecule, and (IV) anhydrides of acids of groups I, II or III, with (b) a graft copolymer of an unsaturated dicarboxylic acid or the anhydride of an unsaturated dicarboxylic acid and a propylene polymer in such proportions that 1 to 90% of the functions

contained in the acid and/or anhydride groups of (a) and (b) are present in the acid or anhydride component of the graft copolymer.

2. A process according to claim 1 wherein the component (a) is at least one compound from the group consisting of benzoic acid, lactic acid, oxalic acid, malonic acid, succinic acid, adipic acid, maleic acid, fumaric acid, itaconic acid, tartaric acid, phthalic acid, citric acid, thiodipropionic acid, nitrilotriacetic acid, benzoic anhydride, maleic anhydride, succinic anhydride, phthalic anhydride, glutaric anhydride, pyromellitic dianhydride and an anhydride of formula

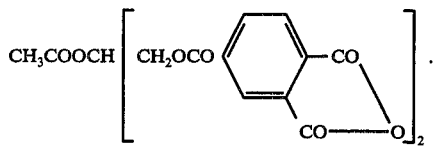

3. The process of claim 2 wherein component (b) is a graft copolymer obtained from maleic acid, itaconic acid or maleic anhydride and a propylene polymer.

4. The process of claim 1 wherein either phthalic anhydride, or maleic anhydride is mixed with a graft copolymer of maleic anhydride and a propylene polymer.

5. The process of claim 1 wherein the proportions of (a) and (b) are such that from 25 up to 80% of the functions

contained in the composition are present as the acid and/or anhydride component of the graft copolymer.

6. The process of claim 1 wherein the graft copolymer is a graft copolymer of an unsaturated dicarboxylic acid or the anhydride of an unsaturated dicarboxylic acid and a crystalline propylene polymer or copolymer.

7. The process of claim 1 wherein component (a) is lactic acid or the anhydride thereof.

8. The process of claim 1 wherein (a) an unsaturated dicarboxylic acid or the anhydride of an unsaturated dicarboxylic acid is mixed with (b) a graft copolymer of a propylene polymer and the same carboxylic acid or carboxylic acid anhydride as the unsaturated dicarboxylic acid or anhydride which is used as component (a).

9. The process of claim 1 wherein component (b) is a graft copolymer of maleic anhydride and a propylene polymer which contains at least 0.4% and not more than 6% by weight of grafted maleic anhydride.

10. The process of claim 1 wherein, as a preliminary step, the graft copolymer is prepared by mixing the propylene polymer with an excess of either an unsaturated dicarboxylic acid, or an anhydride of an unsaturated dicarboxylic acid, subjecting the mixture to a graft copolymerisation and removing not more than a part of the excess unreacted acid or anhydride from the graft copolymer.

11. The process of claim 1 wherein components (a) and (b) are also mixed with a crystalline propylene polymer or copolymer and an inorganic filler.

12. The process of claim 11 wherein the inorganic filler is a fibrous reinforcing material which is coated with a silane containing at least one substituent which substituent is reactive with the filler and at least one acid reactive organic substituent.

13. The process of claim 12 wherein the inorganic filler is glass fiber coated with γ-aminopropyltriethoxy silane.

14. The process of claim 11 wherein the filler is glass fiber and component (a), component (b), the crystalline propylene polymer or copolymer, and the glass fiber, are mixed together in proportions such that the total amount of acid and/or anhydride, combined and free, is in the range 0.02 to 1.0% by weight.

* * * * *

UNITED STATES PATENT OFFICE
CERTIFICATE OF CORRECTION

Patent No. 4,082,720    Dated Apr. 4, 1978

Inventor(s) Terence John Henman, and Graham Williams

It is certified that error appears in the above-identified patent and that said Letters Patent are hereby corrected as shown below:

Under the heading "Related U.S. Application Data" at section [63], please correct the filing date of Ser. No. 257,143, to read --May 26, 1972--.

*Signed and Sealed this*

*Sixteenth* Day of *January 1979*

[SEAL]

*Attest:*

RUTH C. MASON
*Attesting Officer*

DONALD W. BANNER
*Commissioner of Patents and Trademarks*